United States Patent
Saeki et al.

(10) Patent No.: US 8,069,941 B2
(45) Date of Patent: Dec. 6, 2011

(54) FUEL CELL VEHICLE

(75) Inventors: Hibiki Saeki, Saitama (JP); Takuya Shirasaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 838 days.

(21) Appl. No.: 12/136,545

(22) Filed: Jun. 10, 2008

(65) Prior Publication Data

US 2008/0308329 A1  Dec. 18, 2008

(30) Foreign Application Priority Data

Jun. 12, 2007 (JP) ................................ 2007-155084
Mar. 18, 2008 (JP) ................................ 2008-069997

(51) Int. Cl.
   *B60K 1/00* (2006.01)
(52) U.S. Cl. ......... 180/65.31; 429/12; 429/13; 903/908; 180/65.1
(58) Field of Classification Search ...... 180/65.1–65.31; 429/12, 13, 23, 26; 903/908
   See application file for complete search history.

(56) References Cited

U.S. PATENT DOCUMENTS

| | | | |
|---|---|---|---|
| 6,584,075 B1* | 6/2003 | Gupta et al. | 370/256 |
| 7,413,044 B2* | 8/2008 | Uenodai et al. | 180/65.31 |
| 7,659,018 B2* | 2/2010 | Aoyagi et al. | 429/431 |
| 7,722,920 B2* | 5/2010 | Mickle et al. | 427/96.1 |
| 2003/0113601 A1* | 6/2003 | Edlund et al. | 429/23 |
| 2006/0021812 A1 | 2/2006 | Saeki et al. | |
| 2006/0222910 A1 | 10/2006 | Aoyagi et al. | |
| 2007/0054166 A1 | 3/2007 | Ojima et al. | |

FOREIGN PATENT DOCUMENTS

| | | |
|---|---|---|
| JP | 2001-359204 | 12/2001 |
| JP | 2002-216818 | 8/2002 |
| JP | 2005-197030 A | 7/2005 |
| JP | 2006-286320 | 10/2006 |
| JP | 2006-331672 | 12/2006 |
| JP | 2007-317469 | 12/2007 |

OTHER PUBLICATIONS

Notice of Reasons for Rejection for Application No. 2008-069997, dated Feb. 23, 2010.
European Office Action for Application No. 08010612.3, dated Oct. 14, 2008.
Japanese Office Action for Application No. 2008-069997, dated Jun. 9, 2009.

* cited by examiner

*Primary Examiner* — J. Allen Shriver, II
*Assistant Examiner* — James Triggs
(74) *Attorney, Agent, or Firm* — Nelson Mullins Riley & Scarborough LLP; Anthony A. Laurentano

(57) ABSTRACT

A fuel cell vehicle capable of improving energy efficiency by reducing switching loss is provided. The fuel cell vehicle includes: a fuel cell that generates direct current power; inverters which respectively include switching elements and convert the direct current power generated by the fuel cell into alternating current power; a diode that prevents current from flowing from the inverters toward the fuel cell; a step up/down DC/DC converter that adjusts the voltage of the cathode side of the diode; a voltage control part that controls the step up/down DC/DC converter, thereby controlling current output from the fuel cell; and a stop and idle determination part that stops the supply of air to the fuel cell, thereby stopping idling of the fuel cell. The voltage control part reduces the voltage of the cathode side of the diode as the voltage of the fuel cell is reduced by activating the stop and idle determination part.

9 Claims, 4 Drawing Sheets

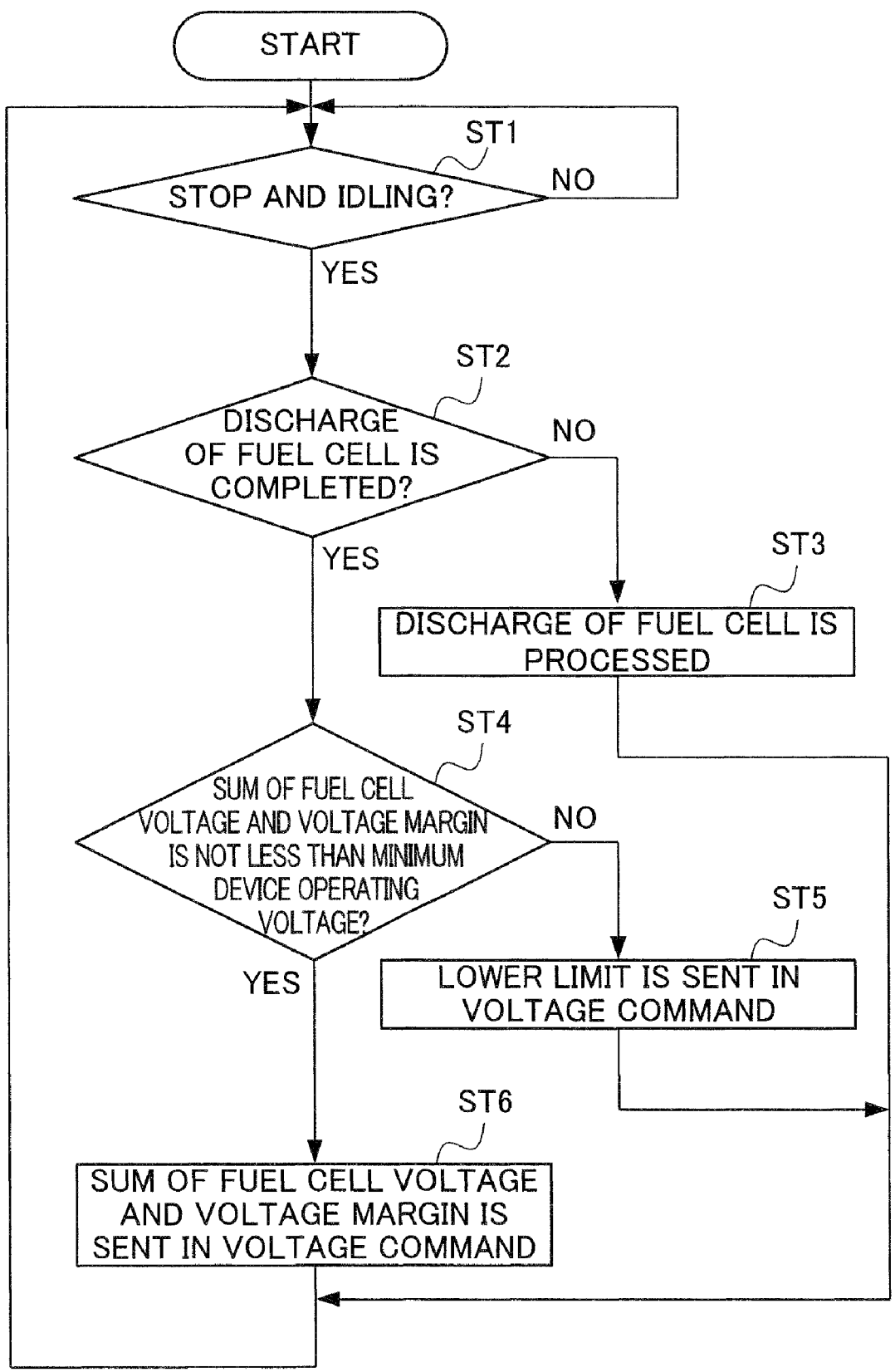

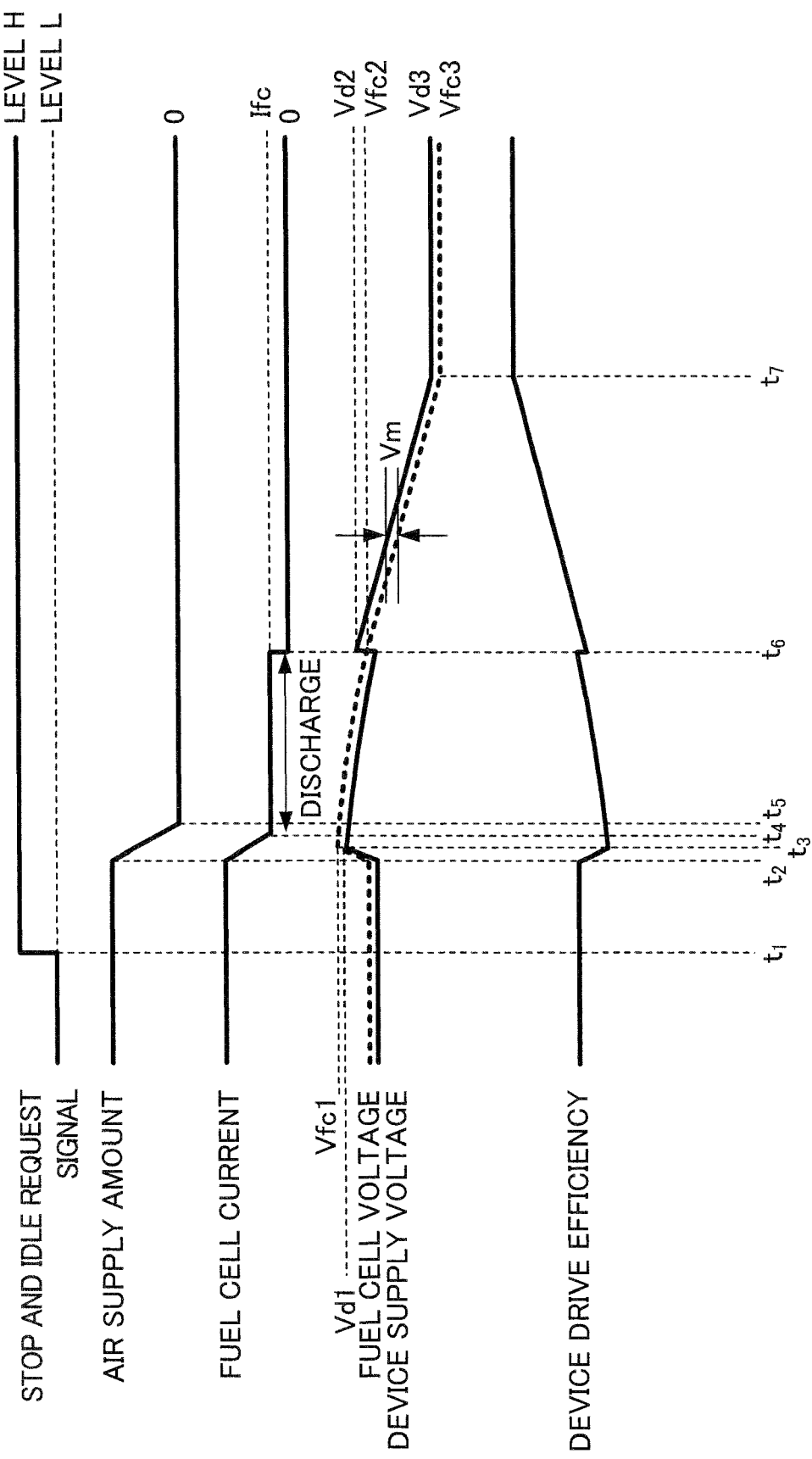

FUEL CELL VEHICLE

This application is based on and claims the benefit of priority based upon Paris Convention for the Protection of Industrial Property from Japanese Patent Application No. 2007-155084, filed on 12 Jun. 2007, and Japanese Patent Application No. 2008-069997, filed on 18 Mar. 2008, the contents of which are incorporated herein by reference.

BACKGROUND OF THE INVENTION

1. Field of the Invention

The present invention relates to a fuel cell vehicle. More specifically, the present invention relates to a fuel cell vehicle capable of improving energy efficiency by reducing switching loss.

2. Related Art

In recent years, fuel cell systems have attracted attention as a power source for vehicles. A fuel cell system has, for example, a fuel cell that generates electric power by causing a reactive gas to react chemically, a reactive gas supply device that supplies the fuel cell with the reactive gas via a reactive gas flow channel, and a control device that controls the reactive gas supply device.

The fuel cell has a stack structure in which, for example, several tens to several hundreds of cells are stacked. Each of the cells is configured by sandwiching a membrane electrode structure (MEA) between a pair of separators. The membrane electrode structure is configured with two electrodes (an anode (positive) and a cathode (negative)) and a solid polymer electrolyte film.

A hydrogen gas as a reactive gas is supplied to the anode of the fuel cell, while air-containing oxygen is also supplied as another reactive gas to the cathode. An electrochemical reaction thus occurs, thereby generating electric power. Basically, only neutral water is produced at the time when electric power is generated as described above. Fuel cells have, therefore, attracted attention from the viewpoints of environmental impact and use efficiency.

In a fuel cell vehicle equipped with a fuel cell system as described above, direct current power generated by the fuel cell is converted by an inverter into alternating current power, which is supplied to a motor and accessories. Between the fuel cell and the inverter, a diode is arranged with the forward direction of the diode oriented in a direction from the fuel cell toward the inverter, in order to prevent current from flowing from the inverter toward the fuel cell.

In the fuel cell vehicle, the motor and accessories require less electric power when the vehicle is stopped and idling than when the vehicle is traveling. A battery system has, therefore, been proposed that steps up voltage of an inverter to be higher than that of a fuel cell when the vehicle has been stopped and idling (for example, see Unexamined Japanese Patent Application, First Publication No. 2005-197030. According to the proposed fuel cell system, current is prevented from flowing toward the motor or accessories from the fuel cell through the inverter, by stepping up the voltage of the inverter to be higher than that of the fuel cell. Accordingly, energy efficiency is improved.

SUMMARY OF THE INVENTION

However, in the fuel cell vehicle described above, a load on the fuel cell decreases when the vehicle is stopped and idling, and the voltage of the fuel cell is increased accordingly. Therefore, in order to prevent current from flowing into the motor or accessories through the inverter from the fuel cell as described above, the voltage of the inverter needs to be set higher than an open-circuit voltage. Consequently, a case occurs in which switching loss of a switching element provided for the inverter increases so that a satisfactory improvement in energy efficiency is hindered. Therefore, there is a demand for a fuel cell vehicle capable of improving energy efficiency by reducing switching loss.

An object of the present invention is to provide a fuel cell vehicle capable of improving energy efficiency by reducing switching loss.

According to a first aspect of the present invention, a fuel cell vehicle (e.g., a fuel cell vehicle 1 described below) provided with a fuel cell (e.g., a fuel cell 10 described below) that generates direct current power by reaction between hydrogen and air, and a power converter (e.g., an inverter 501 described below) that has a switching element and converts the direct current power generated by the fuel cell into alternating current power, includes: a rectifier (e.g., a diode 13 described below) that is provided between the fuel cell and the power converter and prevents current from flowing toward the fuel cell from the power converter; a voltage-adjusting device (e.g., a step up/down DC/DC converter 301 described below) that adjusts a voltage between the rectifier and the power converter; a fuel cell current control means (e.g., a voltage control part 203 described below) for controlling the voltage-adjusting device to control current output from the fuel cell; and a stop and idle means (e.g., a stop and idle determination part 201) for stopping air supply to the fuel cell to stop idling of the fuel cell, in which, when the stop and idle means is activated, the fuel cell current control means reduces the voltage between the rectifier and the power converter.

Here, stopping idling of the fuel cell as described above is intended to include a case in which the fuel cell vehicle is stopped and idling or driven by power supplied from the electric storage device in which current output from the fuel cell is stored. According to the present invention, the stop and idle means stops air supply to the fuel cell when idling of the fuel cell is stopped, e.g., when the fuel cell vehicle is stopped and idling or when the fuel cell vehicle travels being driven by battery. Then, the amount of power generation from the fuel cell is reduced, and the voltage of the fuel cell is reduced accordingly. As the voltage of the fuel cell is reduced, voltage between the rectifier and the power converter is reduced. As a result, the voltage of the power converter is reduced. Accordingly, switching loss of switching elements of the power converter and the voltage-adjusting device is reduced so that the energy efficiency of the fuel cell vehicle is substantially improved.

In this case it is preferable that when the stop and idle means is activated, the fuel cell current control means then reduces the voltage between the rectifier and the power converter to be lower than that of the fuel cell, so that current is drawn from the fuel cell to accelerate to reduce the voltage of the fuel cell.

According to this invention, when the fuel cell current control means activates the stop and idle means, the voltage between the rectifier and the power converter is reduced to be lower than that of the fuel cell. In this manner, current is drawn from the fuel cell to accelerate to reduce the voltage of the fuel cell. Therefore, the voltage of the fuel cell can be reduced quickly, so that the voltage of the power converter can be reduced quickly. Accordingly, switching loss of switching elements of the power converter and the voltage-adjusting device is reduced so that energy efficiency of the fuel cell vehicle is substantially improved.

In this case, it is preferable that a motor (e.g., a motor 50 described below) that drives the fuel cell vehicle is connected to the power converter, and the power converter that is connected to the motor, and an electric storage device (e.g., an energy storage 30 described below) that stores the current output from the fuel cell are connected in parallel with the fuel cell.

Electric power, which the motor generates by performing as an electric generator, is referred to as "regenerative electric power". The regenerative electric power is stored in the electric storage device to supply to other electric devices.

According to the present invention, since an electric storage device for storing current output from the fuel cell is provided, power generated by the fuel cell can be used efficiently.

In this case, it is preferable that the fuel cell current control means stores, in the electric storage device, current generated by hydrogen and air remaining in the fuel cell after idling of the fuel cell is stopped.

When idling of the fuel cell is stopped, the fuel cell generates power with the remaining hydrogen and air. According to the present invention, current generated by the remaining hydrogen and air is stored in the electric storage device, so that power generated by the fuel cell can be efficiently used.

In this case, it is preferable that the voltage-adjusting device is a DC/DC converter, through which the electric storage device is connected to the power converter in parallel with the fuel cell, and the fuel cell current control means stores, in the electric storage device, the current generated by the hydrogen and air remaining in the fuel cell without adjusting voltages by maintaining the connection state of a switching element (e.g., a second transistor described below), which consists of the DC/DC converter.

According to the present invention, when the current generated by the hydrogen and air remaining in the fuel cell is stored in the electric storage device, the connection state of the switching element of the DC/DC converter is maintained. Therefore, switching loss of the DC/DC converter is prevented from occurring.

In this case, an accessory (e.g., an air pump 12 and an electric accessory 40) required for driving the fuel cell vehicle is connected between the rectifier and the electric power converter.

Accessories may include a type of device that is driven by alternating current power. Therefore, the accessory in the desirable configuration is provided with a power converter for the accessory, which includes a switching element and converts direct current power generated by the fuel cell into alternating current power. According to the present invention, the accessory is provided between the rectifier and the power converter. Therefore, the voltage of the power converter for the accessory can be reduced by reducing the voltage between the rectifier and the power converter as well as that of another power converter described previously. Accordingly, switching loss of the switching element provided in the power converter for the accessory is reduced so that energy efficiency of the fuel cell vehicle is substantially improved.

In this case, it is preferable that the fuel cell current control means sets the lower limit of the voltage between the rectifier and the power converter to be not less than the minimum operating voltage of the power converter or the voltage-adjusting device.

According to the present invention, the fuel cell current control means sets the lower limit of the voltage between the rectifier and the power converter to be not less than the minimum operating voltage of the power converter or the voltage-adjusting device. In this manner, even when the voltage between the rectifier and the power converter is reduced, a minimum operating voltage is guaranteed for the power converter or the voltage-adjusting device. Accordingly, malfunctions can be prevented from occurring.

According to the present invention, the stop and idle means stops the supply of air to the fuel cell when idling of the fuel cell is stopped, e.g., when the fuel cell vehicle is stopped and idling or driven by a battery. Then, the voltage of the fuel cell is reduced. In accordance with reduction of the voltage of the fuel cell, the voltage between the rectifier and the power converter is reduced. As a result, the voltage of the power converter is reduced. Accordingly, switching loss of switching elements of the power converter and the voltage-adjusting device is reduced so that energy efficiency of the fuel cell vehicle is substantially improved.

BRIEF DESCRIPTION OF THE DRAWINGS

FIG. 3 is a flowchart for explaining operation of the fuel cell vehicle; and

FIG. 4 is a timing chart of operation when the fuel cell vehicle is stopped and idling.

DETAILED DESCRIPTION OF THE INVENTION

Figure 1:
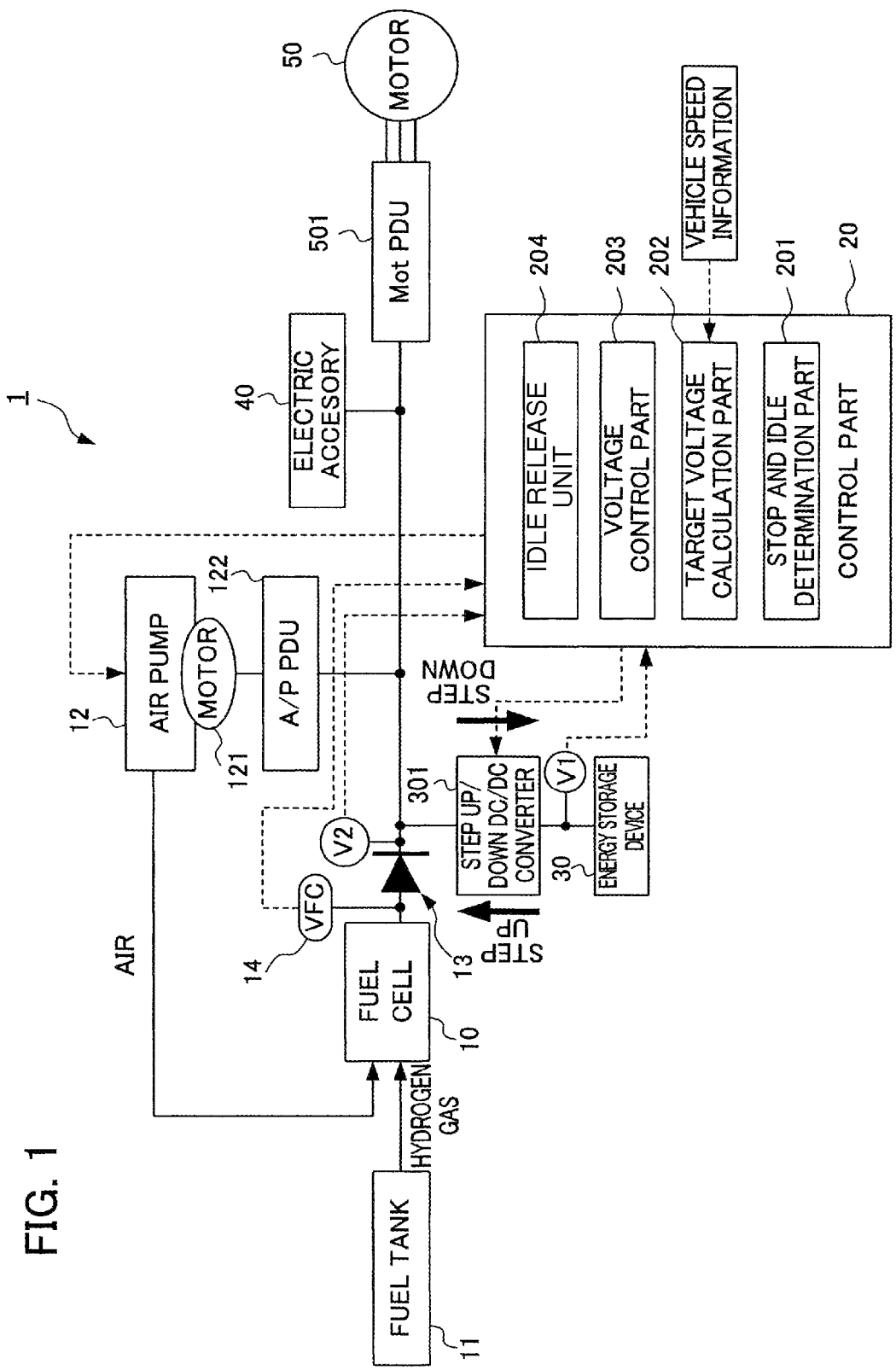
FIG. 1 is a block diagram showing a fuel cell vehicle according to an embodiment of the present invention.

Hereafter, embodiments of the present invention is described with reference to the drawings. FIG. 1 is a block diagram showing a fuel cell vehicle 1 according to one embodiment of the present invention.

The fuel cell vehicle includes a fuel cell 10 that is supplied with hydrogen gas and air, and generates electric power by electrochemical reaction between the gas and air, a fuel tank 11 that supplies the hydrogen gas to the fuel cell 10, an air pump 12 as an accessory, a control part 20 that controls the amount of hydrogen gas and air supplied to the fuel cell 10, an energy storage device 30 that functions as an electric storage device which stores current output from the fuel cell 10, and a motor 50 that is driven by electric power supplied from the fuel cell 10 and the energy storage 30.

The fuel cell 10 is connected to the anode side of a diode 13. The motor 50 is connected to the cathode side of the diode 13 through an inverter 501 as an electric power converter. That is, the diode 13 is provided between the fuel cell 10 and the inverter 501. In addition, the energy storage 30 is connected through a step up/down DC/DC converter 301 as a voltage-adjusting device to the cathode side of the diode 13. That is, the inverter 501 and the energy storage 30 are connected in parallel with the fuel cell 10 through the diode 13.

Furthermore, the air pump 12 is connected through an inverter 122 as a power converter to the cathode side of the diode 13. In addition, an electric accessory 40 is also connected to the cathode side of the diode 13. That is, an accessory required for driving the fuel cell vehicle 1 is connected between the diode 13 and the step up/down DC/DC converter 301.

The fuel cell 10 generates direct current electric power by an electrochemical reaction of the supplied hydrogen gas and air. The diode 13 prevents current from flowing toward the fuel cell 10 from the step up/down DC/DC converter 301, the electric accessory 40, and the inverters 122 and 501.

The energy storage device 30 stores current output from the fuel cell 10 and outputs the current as direct current power. The step up/down DC/DC converter 301 steps up the direct current power output from the energy storage 30 to supply the stepped-up power to the cathode side of the diode 13, and steps down the voltage of the direct current power supplied from the fuel cell 10 through the diode 13 to supply the energy storage device 30 with the reduced power, based on a control signal transmitted from the control part 20.

Figure 2:
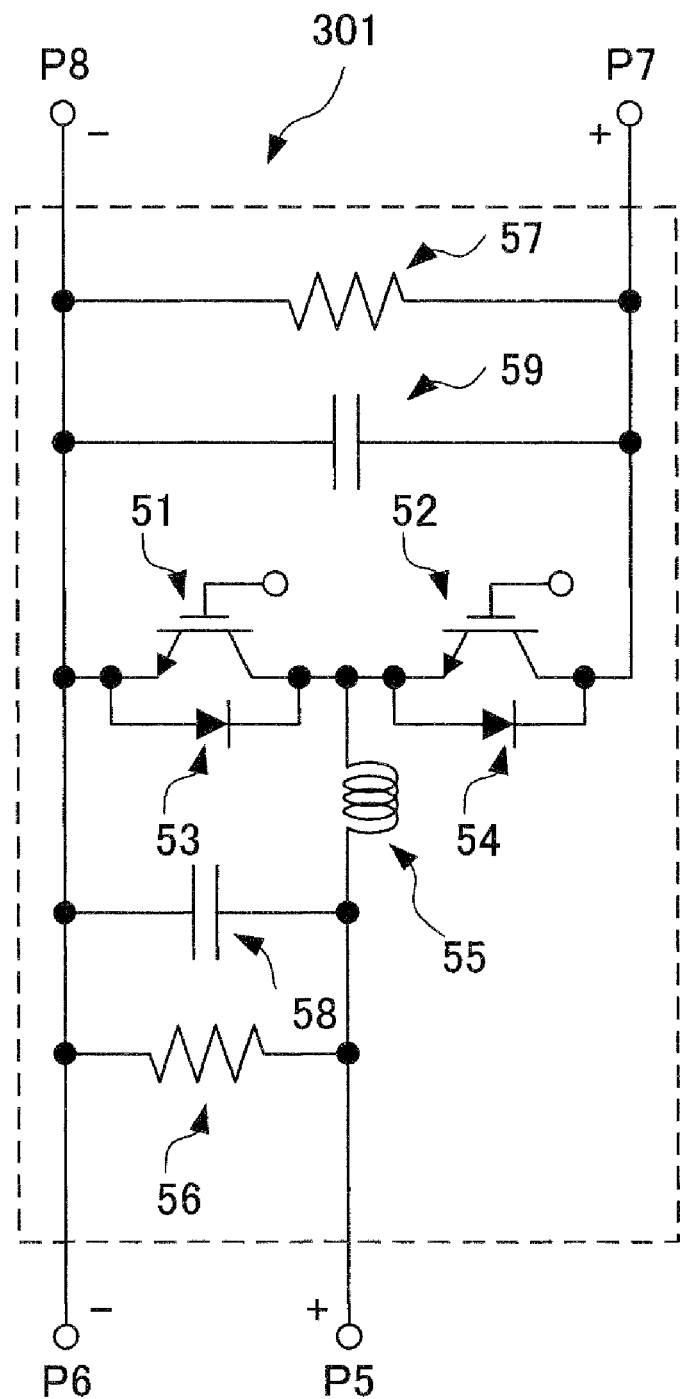
FIG. 2 is a block diagram showing the configuration of the DC/DC converter in the fuel cell vehicle.

FIG. 2 is a circuit diagram showing the step up/down DC/DC converter 301. The step up/down DC/DC converter 301 includes a first transistor 51, a second transistor 52, a first diode 53, a second diode 54, a reactor 55, a first resistor 56, a second resistor 57, a first smoothing condenser 58, and a second smoothing condenser 59. The step up/down DC/DC converter 301 is provided with positive terminals P5 and P7 and negative terminals P6 and P8.

A first end of the reactor 55 is connected to the positive terminal P5. The first transistor 51 and the second transistor 52 each consists of an IGBT (Insulated Gate Bipolar Mode Transistor), for example. A collector of the first transistor 51 is connected to a second end of the reactor 55. An emitter of the first transistor 51 is connected to the negative terminals P6 and P8. A gate of the first transistor 51 is connected to a control circuit (not shown). A collector of the second transistor 52 is connected to the positive terminal P7. An emitter of the second transistor 52 is connected to the second end of the reactor 55. A gate of the second transistor 52 is connected to the control circuit (not shown).

Furthermore, the first diode 53 is connected between the emitter and the collector of the first transistor 51, with the forward direction of the diode 53 in a direction from the emitter to the collector. The second diode 54 is connected between the emitter and the collector of the second transistor 52, with the forward direction of the diode 54 in a direction from the emitter to the collector.

The first resistor 56 and the first smoothing condenser 58 are connected at their first ends to the positive terminal P5, as well as at their second ends to the negative terminal P6. The second resistor 57 and the second smoothing condenser 59 are connected at their first ends to the positive terminal P7, as well as at their second ends to the negative terminal P8.

This step up/down DC/DC converter 301 operates as follows. That is, at first, the first transistor 51 and the second transistor 52 are turned off, and direct current power is supplied to the positive terminal P5. Then, a voltage corresponding to the direct current power is applied to the first smoothing condenser 58, thereby starting electrically charging of the first smoothing condenser 58.

Next, the first transistor 51 is turned on after charging of the first smoothing condenser 58 is completed. Then, current flows to the negative terminal P6 through the reactor 55 and the first transistor 51 from the positive terminal P5. The reactor 55 is magnetically excited by this current so that magnetic energy is accumulated.

Next, the first transistor 51 is turned off. Then, a back electromotive force is generated by the magnetic energy accumulated in the reactor 55. This back electromotive force is superimposed on the voltage of the first smoothing condenser 58, and is output through the positive terminal P7.

That is, direct current power is supplied to the positive terminal P5 while controlling the turning on/off of the first transistor 51 and the second transistor 52. Accordingly, the step up/down DC/DC converter 301 steps up the voltage corresponding to the direct current power supplied to the positive terminal P5, and outputs the stepped-up voltage through the positive terminal P7.

Referring back to FIG. 1, the air pump 12 includes the motor 121 consisting of a three-phase AC motor and supplies air to the fuel cell 10 by driving of the motor 121 based on a control signal transmitted from the control part 20. The motor 50 is a three-phase AC motor, and drives the wheels (not shown) by alternating current power.

The inverters 122 and 501 each have a switching element called an IGBT (Insulated Gate Bipolar Mode Transistor). The direct current power generated by the fuel cell 10 or output from the energy storage 30 through the step up/down DC/DC converter 301 is converted into alternating current power. The electric accessory 40 is configured so as to include, for example, a downverter (not shown) having a switching element.

The control part 20 has a stop and idle determination part 201 as a stop and idle means, the target voltage calculation part 202, a voltage control part 203 as a fuel cell current control means, and an idle release unit 204.

The stop and idle determination part 201 determines whether or not the fuel cell vehicle 1 is stopped and idling. If it is determined that the fuel cell vehicle 1 is stopped and idling, the stop and idle determination part 201 stops the supply of air from the air pump 12 to the fuel cell 10, thereby stopping idling of the fuel cell 10. More specifically, when the vehicle speed of the fuel cell vehicle 1 measured by a speed measurement part (not shown) is not greater than the predetermined value, it is determined that the fuel cell vehicle 1 is stopped and idling, and a signal for requesting stop of the motor 121 is transmitted to the air pump 12.

In the cases in which the vehicle speed is not less than the predetermined value, the accelerator pedal is depressed by not less than the predetermined amount, or the output of the motor 121 is not less than the predetermined value, the idle release part 204, releases stop of idling the fuel cell.

The voltage control part 203 controls the step up/down DC/DC converter 301, thereby controlling the current output from the fuel cell 10. Specifically, the voltage control part 203 transmits the target voltage value in a voltage command to the step up/down DC/DC converter 301 when idling of the fuel cell 10 is stopped by the stop and idle determination part 201. If idling of the fuel cell is stopped, the fuel cell 10 generates power by using the remaining hydrogen and air. However, electricity is discharged of the fuel cell 10 by the step up/down DC/DC converter 301, so that the current output from the fuel cell 10 is stored in the energy storage device 30. In addition, the voltage VFC of the fuel cell 10 is reduced to prevent the current from flowing out of the fuel cell 10 thereafter.

The target voltage calculation part 202 sets a voltage between the diode 13 and the step up/down DC/DC converter 301 based on the voltage VFC of the fuel cell 10, which is measured by a voltmeter 14. In this embodiment, the voltage to be set at this time is the target voltage for the voltage V2 of the cathode side of the diode 13. That is, when electricity is discharged of the fuel cell 10, the target voltage for the voltage V2 of the cathode side of the diode 13 is set to be lower by the voltage margin Vm than the voltage VFC of the fuel cell 10. When discharge of the fuel cell 10 is completed, the target voltage for the voltage V2 of the cathode side of the diode 13 is then set to be higher by the voltage margin Vm than the voltage VFC of the fuel cell 10.

The voltage margin Vm is set based on the accuracy of the voltmeter 14. The lower limit of the target voltage for the voltage V2 of the cathode side of the diode 13 is set as the minimum device operating voltage. The minimum device operating voltage is the highest of the minimum operating voltages of the step up/down DC/DC converter 301, the electric accessory 40 and the inverters 122 and 501. The minimum device operating voltage is preliminarily stored in a memory part (not shown) of the control part 20.

Operation of the fuel cell vehicle 1 described above is now be further described referring to the flowchart of FIG. 2. In the step ST1, it is determined whether or not the fuel cell vehicle 1 is stopped and idling. More specifically, when the vehicle speed of the fuel cell vehicle 1 is not greater than the predetermined value, the stop and idle determination part 201 determines that the fuel cell vehicle 1 is stopped and idling to proceed to the step ST2. On the other hand, when the vehicle speed of the fuel cell vehicle 1 is greater than the predetermined value, the stop and idle determination part 201 determines that the fuel cell vehicle 1 is stopped and idling to repeat the step ST1.

In the step ST2, it is determined whether or not discharge of the fuel cell 10 has been completed. More specifically, when the voltage VFC of the fuel cell 10 is not greater than the predetermined value, the control part 20 determines that discharge of the fuel cell 10 is completed to proceed to the step ST4. On the other hand, when the voltage VFC of the fuel cell 10 is greater than the predetermined value, the control part 20 determines that discharge of the fuel cell 10 is incomplete to proceed to the step ST3.

In the step ST3, discharge of the fuel cell 10 is carried out to return to the step ST1. More specifically, the voltage V2 of the cathode side of the diode 13 is set to be lower than the voltage VFC of the fuel cell 10 by the voltage control part 203. Then, current is drawn from the fuel cell 10 so that direct current power is extracted. Accordingly, the voltage VFC of the fuel cell 10 is reduced. Furthermore, when the energy storage device 30 is not fully charged and the voltage V1 of the energy storage device 30 is lower than the voltage VFC of the fuel cell 10, the direct current power extracted from the fuel cell 10 is stepped down by the step up/down DC/DC converter 301 and stored in the energy storage 30.

In addition, the stop and idle determination part 201 transmits a control signal for requesting the air pump 12 to stop the motor 121, thereby stopping the supply of air from the air pump 12 to the fuel cell 10. Then, since shortage of oxygen occurs on the side of the cathode of the fuel cell 10, the amount of power generation in the fuel cell 10 decreases, and the voltage VFC of the fuel cell 10 is reduced.

As described above, discharge of the fuel cell 10 and the stopping of air supply to the fuel cell 10 causes the voltage VFC of the fuel cell 10 to be reduced, so that the voltage V2 of the cathode side of the diode 13 is reduced accordingly. The voltage control part 203 accelerates to reduce the voltage VFC of the fuel cell 10 as well as the voltage V2 of the cathode side of the diode 13 is accelerated, in order to reduce the voltage V2 on the cathode side of the diode 13 to be lower than the voltage VFC of the fuel cell 10.

In the step ST4, the control part 20 determines whether or not the sum of the voltage VFC of the fuel cell 10 and the voltage margin Vm is greater than the minimum device operating voltage. If YES, the process proceeds to the step ST6. If NO, the process proceeds to the step ST5.

In the step ST5, the minimum device operating voltage is set as the target voltage for the voltage V2 of the cathode side of the diode 13 by the target voltage calculation part 202. In addition, the voltage control part 203 sets the voltage of the cathode side of the diode 13 to the minimum device operating voltage to return to the step ST1. In this manner, the minimum device operating voltage is guaranteed for the step up/down DC/DC converter 301, electric accessory 40, and inverters 122 and 501. Furthermore, the voltage V2 of the cathode side of the diode 13 is increased to be greater than the voltage VFC of the fuel cell 10. Therefore, no current flows from the fuel cell 10 through the diode 13.

In the step ST6, the target voltage calculation part 202 sets the sum of the voltage VFC of the fuel cell 10 and the voltage margin Vm to the target voltage for the voltage V2 of the cathode side of the diode 13. The voltage control part 203 sets the voltage of the cathode side of the diode 13 to this target voltage to return to the step ST1. As a result, the voltage V2 of the cathode side of the diode 13 is increased to be greater than the voltage VFC of the fuel cell 10, thereby preventing current from flowing from the fuel cell 10 through the diode 13.

FIG. 4 is a timing chart when the fuel cell vehicle 1 is stopped and idling. At the time t1 when the vehicle speed of the fuel cell vehicle 1 is reduced less than the predetermined value, the stop and idle determination part 201 determines that the fuel cell vehicle 1 is stopped and idling, shifts the level of a stop and idle request signal from the level L to the level H, and transmits, to the air pump 12, a signal for requesting the air pump 12 to stop the motor 121.

In the period from the time t2 to the time t3, the rotation speed of the motor 121 of the air pump 12 is reduced so that the amount of air supplied to the fuel cell 10 from the air pump 12 decreases. As a result, the shortage of oxygen occurs on the cathode side of the fuel cell 10, which causes the amount of power generation from the fuel cell 10 to be reduced. Accordingly, a fuel cell current output from the fuel cell 10 decreases. In addition, power consumption of the motor 121 decreases so that the load to the fuel cell 10 decreases. Therefore, the fuel cell voltage, which is the voltage VFC of the fuel cell 10, is increased and reaches Vfc1 at the time t3.

The voltage V2 of the cathode side of the diode 13, which is the voltage to be supplied to devices, is increased in accordance with increasing of the fuel cell voltage, and reaches Vd1 at the time t3. Accordingly, the voltages of the electric accessory 40 and the inverters 122 and 501 are also increased.

In a period from the time t3 to the time t6, the amount of air supplied to the fuel cell 10 from the air pump 12 continues to decrease. At the time t5, the amount of air supplied to the fuel cell 10 becomes zero. Therefore, shortage of oxygen further occurs on the cathode side of the fuel cell 10. Accordingly, the amount of power generation from the fuel cell 10 further decreases, and the fuel cell voltage is reduced accordingly. In addition, the fuel cell current output from the fuel cell 10 decreases and reaches Ifc at the time t4. Furthermore, current is drawn from the fuel cell 10 due to discharge of the fuel cell 10, so that direct current power generated by the fuel cell 10 is extracted to accelerate to reduce the fuel cell voltage.

As described above, a stop in the supply of air to the fuel cell 10 and discharge of the fuel cell 10 causes the fuel cell voltage to be reduced to Vfc2 at the time t6. The device supply voltage is reduced in accordance with reduction of the fuel cell voltage. As a result, the voltages of the electric accessory 40 and the inverters 122 and 501 are reduced. Accordingly, the switching loss of each switching element decreases, and driving efficiencies of the devices are improved during the period from the point in point t3 to the time t6.

At the time t6, discharging is completed, and the device supply voltage, therefore, reaches Vd2, which is higher by the voltage margin Vm than the fuel cell voltage Vfc2. Then, the fuel cell current reaches zero, and the voltages of the electric accessory 40 and the inverters 122 and 501 are increased.

In a period from the time t6 to the time t7, the fuel cell voltage gradually is reduced due to natural electric discharging and reaches Vfc3 at the time t7. In accordance with reduction in the fuel cell voltage, the device supply voltage also is reduced to Vd3 at the time t7. Accordingly, the voltages of the electric accessory 40 and the inverters 122 and 501 are reduced. Switching loss of each switching element is, accordingly, reduced so that driving efficiencies of the devices are improved during the period from the time t6 to the time t7.

According to this embodiment, the following effects are obtained. 1. When idling of the fuel cell 10 is stopped, the stop and idle determination part 201 transmits, to the air pump 12, a signal for requesting the air pump 12 to stop the motor 121. In response to the signal, the supply of air from the air pump 12 to the fuel cell 10 is stopped. Then, the amount of power generation from the fuel cell 10 is reduced, and the voltage of the fuel cell 10 also is reduced accordingly. In accordance with reduction of the voltage of the fuel cell 10, the voltage V2 of the cathode side of the diode 13 is reduced. As a result, the voltages of the electric accessory 40 and the inverters 122 and 501 are reduced, so that switching loss of each of switching elements provided in these devices is reduced at switching elements. Switching loss is also reduced at a switching element of the step up/down DC/DC converter 301. Therefore, the energy efficiency of the fuel cell vehicle 1 is substantially improved.

2. When idling of the fuel cell 10 is stopped, the target voltage calculation part 202 sets the voltage of the cathode side of the diode 13 to be lower than that of the fuel cell 10. Accordingly, the voltage control part 203 reduces the voltage of the cathode side of the diode 13 to the set voltage. Therefore, current is drawn from the fuel cell 10, and direct current power generated by the fuel cell 10 is extracted. Accordingly, the voltage of the fuel cell 10 is reduced quickly. As a result, the voltages of the electric accessory 40 and the inverters 122 and 501 also are reduced quickly. Therefore, switching loss of each of switching elements of these devices is substantially reduced. Accordingly, energy efficiency of the fuel cell vehicle 1 is substantially improved.

3. Since the energy storage 30, in which the current output from the fuel cell 10 is stored, is provided, the current output from the fuel cell 10 is stored on discharge of electricity from the fuel cell 10. Accordingly, electric power generated by the fuel cell 10 can be used effectively.

4. The target voltage calculation part 202 sets, as the lower limit of the voltage V2 of the cathode side of the diode 13 to the highest one of minimum operating voltages of the step up/down DC/DC converter 301, electric accessory 40, and inverters 122 and 501. As a result, even if the step up/down DC/DC converter 301 reduces the voltage V2 of the cathode side of the diode 13, all the minimum operating voltages of the electric accessory 40 and inverters 122 and 501 are guaranteed. Accordingly, the voltages reduced to be lower than assumed are prevented, so that malfunctions are prevented.

5. The voltage margin Vm is set based on the accuracy of the voltmeter 14, which measures the voltage VFC of the fuel cell 10. The voltage margin Vm is used when the target voltage for the voltage V2 of the cathode side of the diode 13 is set. That is, the target voltage for the voltage V2 of the cathode side of the diode 13 is set in consideration of the measurement errors, which may be included in the voltage VFC of the fuel cell 10 as measured by the voltmeter 14. Therefore, even when a measurement error occurs in the measured voltage VFC of the fuel cell 10, electricity is discharged of the fuel cell 10 by reducing the voltage V2 of the cathode side of the diode 13 to be lower than the voltage VFC of the fuel cell 10. In addition, the voltage V2 of the cathode side of the diode 13 is increased to be higher than the voltage VFC of the fuel cell 10 so that current is prevented from flowing out of the fuel cell 10 through the diode 13.

6. Current generated by air and hydrogen remaining in the fuel cell 10 is stored in the energy storage device 30. Therefore, electric power generated by the fuel cell 10 can be fully and effectively used.

The present invention is not limited to the embodiments described above, but should be considered to include variation and modifications considered to be within the scope of the present invention insofar as the object of the present invention is achieved.

For example, the above embodiment is configured to stop idling of the fuel cell 10 when the fuel cell vehicle is stopped and idling. As an alternative configuration, idling of the fuel cell 10 may be stopped even while being driven by a battery, i.e., the fuel cell vehicle 1 is driven by direct-current power supplied from the energy storage device 30.

In addition, when discharge of fuel cell 10 is performed, the voltage control part 203 may maintain the connection state of the second transistor 52 without connecting the first transistor 51, which consists of the step up/down DC/DC converter 301. In this configuration, electricity may be stored in the energy storage 30 without adjusting voltages. In this way, the following effect is achieved.

7. When current generated by air and hydrogen remaining in the fuel cell 10 is stored in the energy storage device 30, the first transistor 51 consisting of the step up/down DC/DC converter 301 is not connected, but the connection state of the second transistor 52 is maintained. As a result, switching loss arising at the step up/down DC/DC converter 301 can be prevented.

What is claimed is:

1. A fuel cell vehicle having a fuel cell that generates direct current power by reaction between hydrogen and air, and a power converter that has a switching element and converts the direct current power generated by the fuel cell, comprising:
    a rectifier disposed between the fuel cell and the power converter that prevents current from flowing toward the fuel cell from the power converter;
    a voltage-adjusting device that adjusts a voltage between the rectifier and the power converter;
    a fuel cell current control unit for controlling the voltage-adjusting device to control current output from the fuel cell; and
    a stop and idle unit for stopping a supply of a reactive gas to the fuel cell,
    wherein, when the stop and idle unit is activated, the fuel cell current control unit reduces the voltage between the rectifier and the power converter, and
    wherein the fuel cell current control unit sets the lower limit of the voltage between the rectifier and the power converter to be not less than a minimum operating voltage of one of the power converter and the voltage-adjusting device.

2. The fuel cell vehicle according to claim 1, wherein when the stop and idle unit is activated, the fuel cell current control unit then reduces the voltage between the rectifier and the power converter to be lower than that of the fuel cell, so that current is drawn from the fuel cell to reduce the voltage of the fuel cell.

3. The fuel cell vehicle according to claim 2, wherein a motor that propels the fuel cell vehicle is connected to the power converter, and the power converter that is connected to the motor and an electric storage device that stores the current output from the fuel cell are connected in parallel with the fuel cell.

4. The fuel cell vehicle according to claim 3, wherein the fuel cell current control unit stores, in the electric storage device, current generated by hydrogen and air that remain in the fuel cell.

5. The fuel cell vehicle according to claim 4, wherein the voltage-adjusting device is a DC/DC converter, the electric storage device is connected to the power converter in parallel with the fuel cell through the DC/DC converter, and the fuel cell current control unit stores, in the electric storage device, the current generated by hydrogen and air remaining in the fuel cell without adjusting voltages by maintaining the connection state of a switching element consisting of the DC/DC converter.

6. The fuel cell vehicle according to claim 1, wherein an accessory required for driving the fuel cell vehicle is connected between the rectifier and the electric power converter.

7. The fuel cell vehicle according to claim 6, wherein the accessory is an air pump that supplies the fuel cell with air.

8. The fuel cell vehicle according to claim 7, wherein the air pump is driven by a three-phase AC motor.

9. The fuel cell vehicle according to claim 1, wherein the stop and idle unit stops the supply of a reactive gas to the fuel cell, based on the vehicle speed of the fuel cell vehicle.

* * * * *